United States Patent [19]
Johnston et al.

[11] 3,757,493
[45] Sept. 11, 1973

[54] DE-MISTER DEVICE

[75] Inventors: Robert A. Johnston, Monroe; Daniel Docherty, Fairfield; Robert L. Arrington, Trumbull, all of Conn.

[73] Assignee: Caledon Engineering, Inc., Fairfield, Conn.

[22] Filed: June 8, 1972

[21] Appl. No.: 261,034

[52] U.S. Cl............. 55/242, 55/126, 55/259, 55/290, 55/302, 55/308, 55/353, 55/355, 55/431, 55/443, 55/462
[51] Int. Cl............................................. B01d 46/22
[58] Field of Search................ 55/113, 114, 115, 55/116, 149, 14, 96, 230, 231, 232, 233, 234, 240, 241, 242, 243, 257, 259, 290, 294, 302, 351, 352, 353, 354, 126, 308, 355, 431, 433, 462; 210/387, 400, 401; 261/80

[56] References Cited
UNITED STATES PATENTS

| | | | |
|---|---|---|---|
| 700,858 | 5/1902 | Thomas | 55/232 |
| 1,216,677 | 2/1917 | Feilmann et al. | 55/290 |
| 1,322,804 | 11/1919 | MacFadden | 261/80 X |
| 1,817,442 | 8/1931 | Martin, Jr. | 261/80 |
| 1,880,017 | 9/1932 | Harmon | 55/257 X |
| 2,076,305 | 4/1937 | Strindberg | 55/353 X |
| 2,216,986 | 10/1940 | Roe | 55/351 X |
| 2,902,834 | 9/1959 | Bosworth, Jr. et al. | 62/78 |
| 3,062,732 | 11/1962 | Keidel | 204/212 |
| 3,075,333 | 1/1963 | Revell | 55/233 |
| 3,252,691 | 5/1966 | Getzin et al. | 261/80 |
| 3,302,795 | 2/1967 | Jacobs | 210/391 |
| 3,375,638 | 4/1968 | Dungler | 55/116 |
| 3,395,518 | 8/1968 | Krane | 55/302 X |
| 3,503,187 | 3/1970 | Deynat | 55/290 |

FOREIGN PATENTS OR APPLICATIONS

| | | | |
|---|---|---|---|
| 772,047 | 6/1934 | France | 55/290 |
| 541,687 | 1/1932 | Germany | 55/290 |
| 385,397 | 3/1965 | Switzerland | 55/354 |

Primary Examiner—Dennis E. Talbert, Jr.
Attorney—Walter G. Hensel

[57] ABSTRACT

De-mister device comprising essentially one or more belts of open mesh or open weave material, resistant to the corrosion and temperature conditions of its operating environment, supported by a pair of power-driven pulleys or rollers respectively journaled in a pair of receptacles, supported by a framework to connect, through lateral openings with corresponding openings on opposite sides of a duct or stack, the belts passing through said openings across the duct or stack with their flat sides facing the direction of flow of particle-laden gases passing through the duct or stack; and a manifold or lance within each receptacle, extending parallel to each pulley or roller — e.g., between the two lengths of belt supported by the pulleys — adapted to direct pressurized jets of air, steam or other fluid against the belts to remove particulate material accumulated on the belts and direct it toward the base of the receptacle. Preferably, one length of belt between the pulleys is reversed by passage over a guide bar between the pulley and the adjacent opening to the duct or stack so as to maintain a 180° twist between the roller and the guide bar — such twist being thus maintained at both ends of the length of belt if the belt itself includes no twist, and at one end if the belt itself includes a twist so as to constitute it a Moebius surface. In this way, the same surface of the two lengths of belt between the supporting pulleys or rollers face the oncoming gas stream in the duct or stack.

1 Claim, 10 Drawing Figures

DE-MISTER DEVICE

This invention relates to a de-mister device for removing entrained solid and/or liquid particles from a gas stream in a duct or stack, and to the combination of such a device with a duct or stack for removal of such entrained particles from the gas stream therein.

Particle-laden gases are conventionally subjected to decontaminating treatment by passage through a scrubber in which they encounter a spray or cascade of water or other liquid, intended to remove entrained particles and to dissolve undesirable gaseous components. The exhaust gases from such a scrubbing operation generally retain a fraction of the originally entrained particles as well as entrained particles of the scrubbing liquid. Residual fractions of gaseous components often render the gases corrosive.

Attempts have been made heretofore to remove the particulate material from the gas stream, e. g., by passage through a cyclone separator, electrostatic precipitator or mechanical filter. In general, such devices prove relatively unsatisfactory because of excessive build-up on their surfaces of moisture and solids which are difficult to remove and which often include corrosive components causing deterioration of the equipment. Positive filters are subject to plugging, and suffer from low treatment capacity. Such filters, including washing or cleansing arrangements, have been disclosed in U.S. Pat. No. 2,792,907 (Replogle) and U.S. Pat. No. 2,511,295 (Roop), but the capacity of such filters is relatively inadequate — without provision of extensive and costly equipment — to handle large volumes of particle-laden gases as encountered in exhaust stack gases from commercial operations, requiring decontamination for anti-pollution purposes.

It is an object of this invention to provide a de-mister device adapted to be installed in a duct or stack through which particle-laden gases pass, which device affords minimum resistance to passage of the gases while, at the same time, promoting efficient deposition of the entrained particles upon the collecting elements of the device within the duct — said device further including means for continuous removal of the collected particles from said collecting elements outside the duct or stack.

The de-mister device of this invention comprises a belt or series of belts, arranged side by side, preferably of foraminous open-weave textile material, which traverse the particle-laden gas stream with their flat surface or surfaces facing the direction of the contaminated gas stream. The belts do not constitute a positive filter through which the gases must pass, but rather, effect removal of entrained particles by deflection of the gas stream around the belts and through the interstices therein, whereby deposition of the particles on the belt material occurs. The belt or belts are carried by a pair of power-rotated rollers or pulleys, located within a pair of receptacles or hoppers, closed to the exterior, on opposite sides of the duct or stack, and communicating therewith through openings through which the belts pass. Further, means are provided to direct jets of compressed air, steam or other fluid against the surface of the belts within said receptacles to remove the particles collected thereon and direct them toward the base of the receptacles. Such means advantageously comprises a manifold or lance, having jet openings therein, extending within each receptacle generally parallel to the roller or pulley therein — either between the two lengths of belt, approaching and leaving the roller, or adjacent the belt or belts as they pass over the roller, having its jets directed in the first case against the surfaces of the belts toward the base of the receptacle, and in the second case, tangential to the roller toward the base of the receptacle.

In a preferred embodiment of the invention, there is provided a guide bar contacting the belts on one side of the opening through which they pass between the duct and a receptacle, the guide bar being located at or adjacent said opening. Within the space between the guide bar and the adjacent roller or pulley, the belts are inverted by twisting them through about 180°, such twist being maintained by contact with the guide bar. A corresponding reverse twist is maintained by the guide bar adjacent the opposite roller or pulley, in the case of a conventional belt. In this way, the same surface of both lengths of belt between the rollers or pulleys faces the oncoming gases within the duct or stack, facilitating removal of particles collected on both lengths of belt by the fluid jets within the receptacles. If, as distinguished from a conventional belt, the latter is constructed to include a twist (forming a Moebius surface), the twist is maintained by a single guide bar between one roller or pulley and the adjacent opening to the duct or stack.

A series of belts can be arranged, in accordance with this invention, in side by side relation on a pair of pulleys or rollers, with spacing devices between them to maintain the desired spacing between them. Alternatively, the pulleys or rollers can be constructed with alternating larger and smaller diameters along their axes, each portion supporting a belt, such that the straight lengths of the belts traversing the duct or stack are in alternate step-wise relation, creating a sinuous path for the particle-laden gases to follow between the belts.

With appropriately open-wave foraminous textile material, a single belt or blanket can be used, presenting a pair of foraminous elements through which most of the contaminated gases pass to deposit the particles contained therein. Such material is also preferably used in a side by side series of belts to facilitate removal of collected particulate material by means of the fluid jets within the receptacles.

The de-mister device of our invention is illustrated in the accompanying drawings, wherein FIG. 1 is an isometric view of the de-mister device of this invention, with portions cut away to show the underlying elements, wherein a side by side series of belts are carried by a pair of rollers, respectively located in a pair of hoppers or receptacles on opposite sides of a duct, each roller having spacing elements thereon to maintain lateral (axial) spacing of the belts on the rollers.

FIGS. 8A to 8F, inclusive, are side elevations of various alternative forms of rollers or pulleys with correspondingly shaped belts carried thereby and shown in transverse cross section.

FIGS. 9A to 9F, inclusive, are transverse cross sections of various sculptured forms of belts which can be employed in the device of this invention, with correspondingly shaped pulleys or rollers.

Figure 10:

FIG. 10 is a fragmentary detail of the preferred type of open weave textile belt fabric employed in the de-mister device of the invention.

Figure 1:
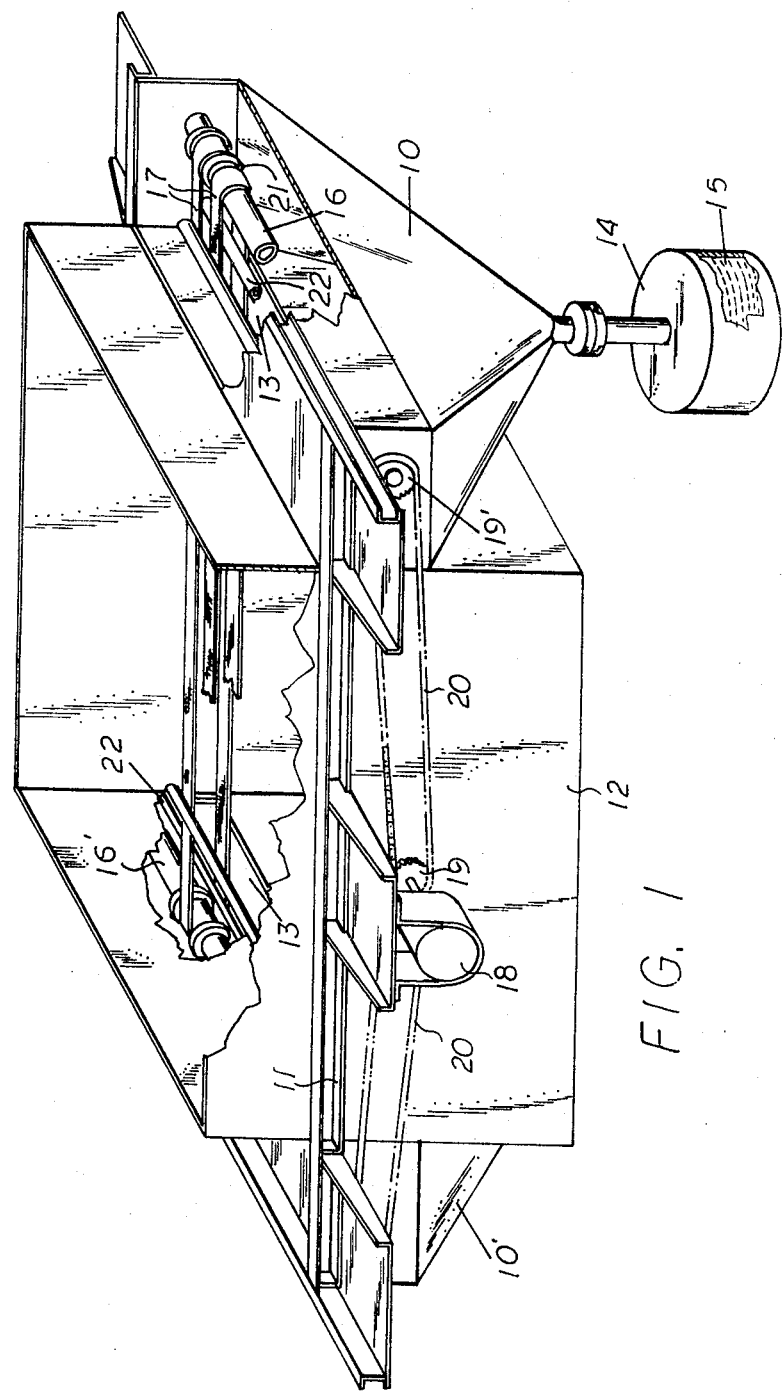

The de-mister device of the invention, as illustrated in FIG. 1, comprises a pair of receptacles or hoppers 10 and 10', supported by a framework 11 on opposite sides of a duct 12 through which gases contaminated by suspended liquid and/or solid particles in the form of a mist pass in upward direction in the embodiment here shown. Hoppers 10 and 10' are closed to the outside atmosphere, but each include rectangular openings 13 registering with corresponding openings on opposite sides of the duct 12 providing access between the interiors of the hoppers and the duct. At their base, the hoppers 10 and 10' are provided with means for removal of collected particles — shown in this illustration as a sump 14 of which the liquid 15 (usually water) seals the outlet against the outer atmosphere and also provides a vehicle for receiving and removing the particles collected in the hopper.

In order to remove suspended particles from the gas stream in duct 12, the de-mister device of this invention comprises a pair of rollers or pulleys 16 and 16', supporting a series of parallel belts 17. The rollers are journaled respectively within the hoppers 10 and 10', and the belts 17 travel from roller 16 to 16' and back through openings 13, across duct 12. In traversing the duct, both lengths of belts 17 present their flat surfaces within the duct to the oncoming gas stream therein.

Power means are provided to rotate rollers 16 and 16' to move belts 17 across duct 12 — such means comprising, for example, motor 18 mounted on the framework 11, and interconnected by sprockets 19 and chains 20 with corresponding sprockets 19' on the ends of rollers 16 and 16'. Lateral spacing of the belts 17 is advantageously maintained by plastic rings 21 (preferably of "Teflon" or similarly friction-reducing plastic) interposed between belts 17 on rollers 16 and 16'.

As indicated above, the flat surfaces of belts 17 face the oncoming particle-laden gases in duct 12, and by virture of the resulting deflection of the gas stream, the particles suspended therein are deposited on the belts. Preferably, the belts 17 are of porous or foraminous material — especially, of loosely woven textile fabric of which the fibres are resistant to corrosive components of the gases and of particulate material suspended therein and to the prevailing temperatures of the gases to be decontaminated. Thus, they may be made of glass fibre or yarn, of polyester fibre, nylon, or any other fibre having appropriate resistance to the environmental conditions within the duct 12. The loosely woven character of the preferred belt material is illustrated in FIG. 10. Such foraminous material permits partly restricted passage through it of the partice-laden gases, while inducing deposition of the suspended particles on the fabric.

Removal of the particulate material deposited on the belts 17 is accomplished in accordance with this invention by subjecting the belts within hoppers 10 and 10' to a blast of pressurized air, steam or other fluid, from a pair of hollow tubes or lances 22, advantageously extending between the upper and lower lengths of belts 17, adjacent respectively to rollers 16 and 16'. Openings are provided along the lances through which jets of compressed air, steam or other fluid are ejected against the surface of the belts 17 in the direction of the base of hoppers 10 and 10'. The jets cause the particles deposited on the belts to fall toward the base of the hoppers 10 and 10' within which the lances 22 are located.

Figure 5:
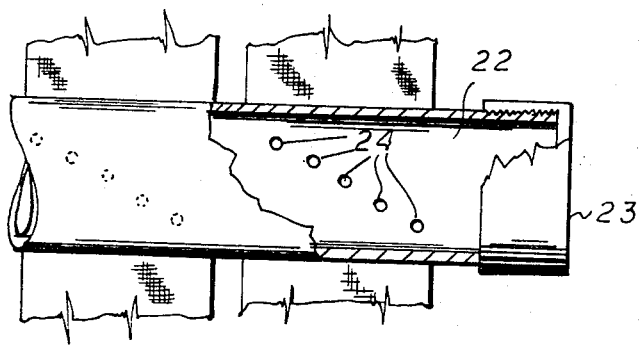
FIG. 5 is a side elevation, with a portion cut away, of the closed end of the compressed air or steam lance, showing a preferred arrangement of the holes constituting the jets for the pressurized fluid, relative to the adjacent belts to be cleansed thereby.
Figure 6:
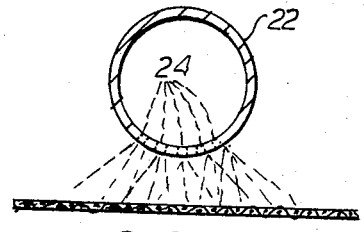
FIG. 6 is a transverse cross section of the lance illustrated in FIG. 5, showing the distribution of the jet emissions from the lance toward a belt, also shown in transverse cross section.

As shown in FIG. 5, each of the lances 22 consists of a length of tubing, closed at its end by a closure 23, and provided with jet openings 24 (e. g., 1/32 inch diameter holes) distributed over an angle of about 40° (see FIG. 6) of the circumference of the lance, such distribution being advantageously provided for each portion of the length of lance opposite one of the belts 17.

Figure 4:
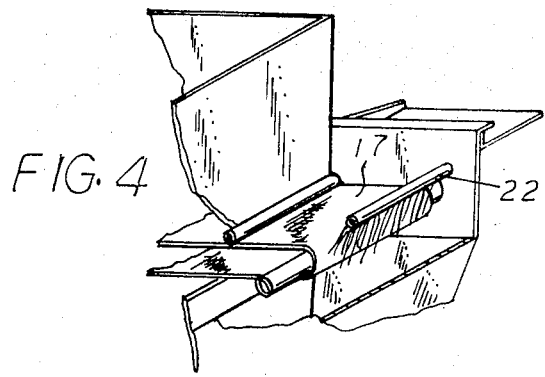
FIG. 4 is a fragmentary view of one end of a belt and its supporting roller, as shown in FIG. 1 or 3, wherein the compressed air or steam lance or manifold is located outside the two lengths of belt, and directs its cleansing fluid jet downward, at a tangent to the roller and the belt as it passes around the latter, toward the base of the receptacle or hopper.

Alternatively, the lance 22 can be located as illustrated in FIG. 4, externally to belt 17, with the mid portion of its jet openings 24 directed at a tangent to belt 17 as it passes over its roller 16 or 16', toward the base of the hopper 10 or 10' within which the lance is located.

Figure 2:
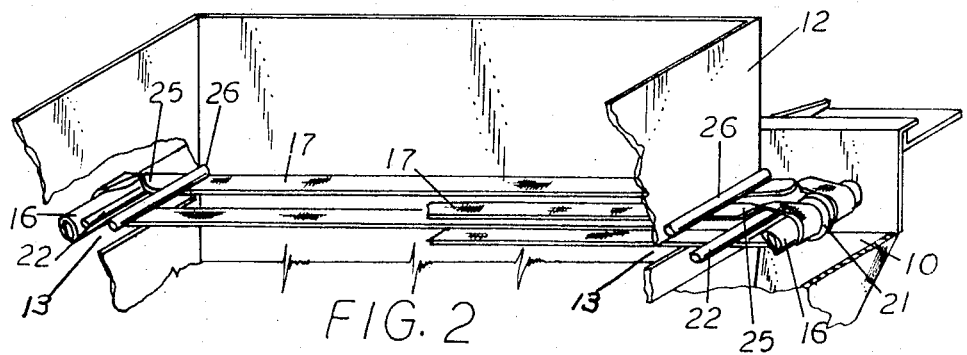
FIG. 2 is a fragmentary view, similar to FIG. 1, in which, however, a 180° twist is maintained in the upper length of each belt between the rollers and the entrance and exit of the belt into and out of the duct through which the gas stream to be de-misted passes.

In a preferred embodiment of the de-mister device of this invention, illustrated in FIG. 2, one length of each belt 17 (the upper length, in this case) is twisted through 180° between roller 16 (and 16') and the adjacent opening 13 where the length of belt emerges from or enters the hopper 10 or 10', such twist, indicated at 25, being maintained by a guide bar 26 parallel to roller 16 or 16', which contacts the belt 17 at about the point where it enters or emerges from hopper 10 or 10'. As illustrated, the guide bars 26 are located at one edge of the opening 13 between hopper 10 or 10' and duct 12. The guide bar 26 can be stationary, or rotatable in order to reduce friction with the belts 17. By providing twists 25, the same surface of both upper and lower lengths of each belt faces the oncoming particle-laden gases within the duct 12, and the particles deposited on the belts are mainly on one side of the belts at the point within the hoppers 10 and 10' at which the jets of air, steam or the like from lances 22 are applied — thus facilitating cleansing of the belts before they again enter the duct 12 while the particles removed by the jets are directed toward the base of hoppers 10 and 10'.

Figure 3:
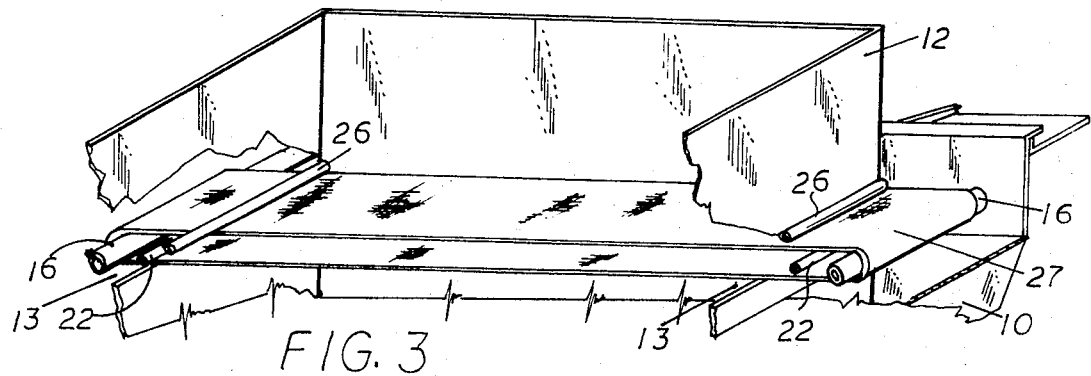
FIG. 3 is a view similar to FIG. 1 in which, however, a single belt or blanket, rather than a series of side by side belts, is provided.

FIG. 3 illustrates a variation in which a single belt 27 of foraminous loosely woven textile material (see FIG. 10) replaces the series of side by side belts 17 of FIGS. 1 and 2. In this case, the gases pass largely through the apertures of each length of belt, and the resulting constrictions cause deposition of the suspended particles on the belt.

Figure 7:
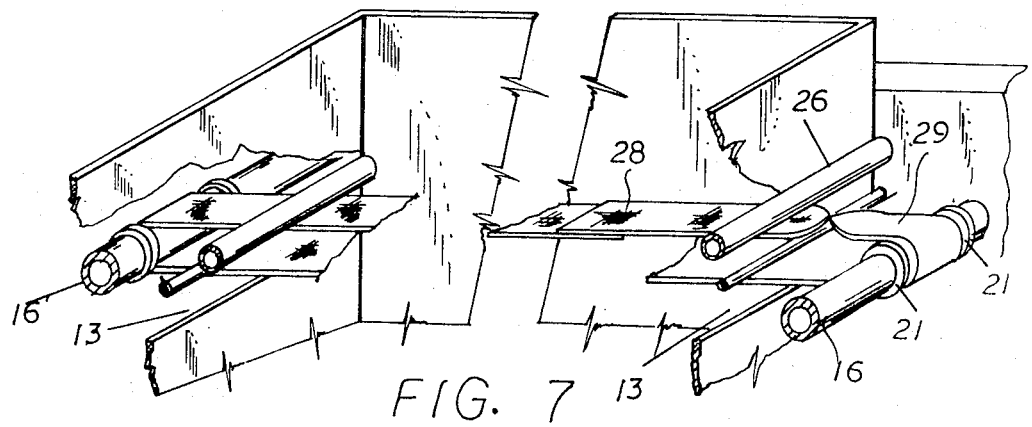
FIG. 7 is an isometric detail of the rollers, hoppers, duct, belt guide and fluid lance, similar to FIG. 2, but wherein the belt (of which one is shown) includes a single 180 degree twist, constituting it a Moebius surface.

FIG. 7 illustrates a variation of the device shown in FIG. 2, in which belts 28 (of which one is shown) replace belts 17, and are constructed each to include a single twist constituting them a Moebius surface. The single twist 29 is maintained, as in the construction of FIG. 2, by one guide bar 26, adjacent roller 16, the corresponding guide bar at the opposite end of the belt being inoperative, since no twist is required at that end of the belt.

Figure 8:
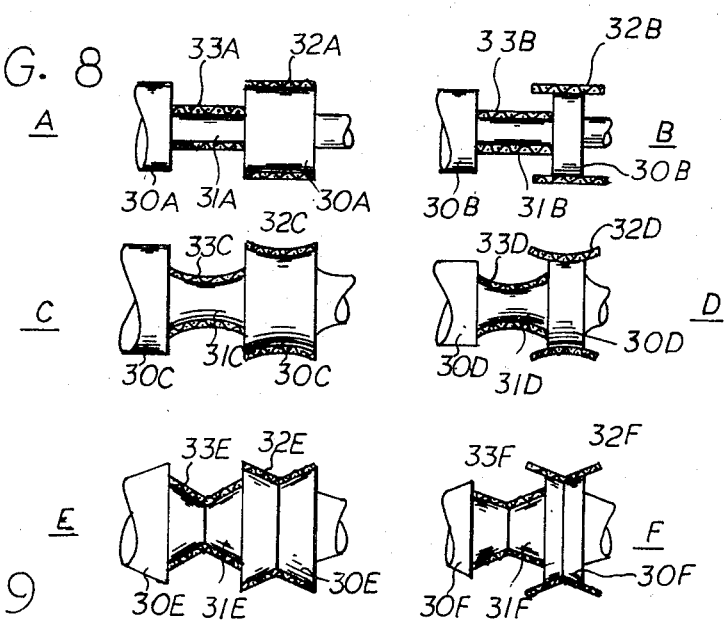

FIGS. 8A to 8F, inclusive, illustrate various forms of rollers and belts suitable for the de-mister device of this invention, wherein each roller or pulley — instead of having a uniform diameter — is constructed to have alternating portions of larger and smaller diameter (30–A, –B, –C, –D, –E and –F – and 31–A, –B, –C, –D, –E and –F), each carrying a belt 32–A, –B, –C, –D, –E and –F and 33–A, –B, –C, –D, –E and –F, generally similar to the belts shown in FIG.. 1. In FIGS. 8A, C, and E, the belts are substantially the same width as the successive portions of the rollers by which they are carried. In FIGS. 8B, D and F, the belts carried by the larger diameter portions 30–B, –D and –F of the rollers are of greater width than their roller supports, so that these belts 32–B, –D, and –F extend over the edges of the supporting roller portions. In either case, the gases in stack or duct 12 passing between the belts are forced to flow in a sinuous path, which is more accentuated in the case of the arrangement shown in FIGS. 8–B, D and F than in that shown in FIG. 8A, C and E. Sinuous deflection of the promotes deposition of the particles on the belts.

In FIGS. 8A and B, the belt-supporting portions of the rollers or pulleys are cylindrical and the belts are correspondingly flat. In FIGS. 8C and D, the profile of the belt-supporting lengths of the roll or pulley are concave, as shown, and the belts are correspondingly shaped to conform to the concave pulley surface. In FIGS. 8E and F, the belt-supporting lengths of the pulley or roller are formed of a pair of truncated cones converging toward the center of each belt-supporting length, and the belts are formed with V-shaped cross sectional shape.

Figure 9:
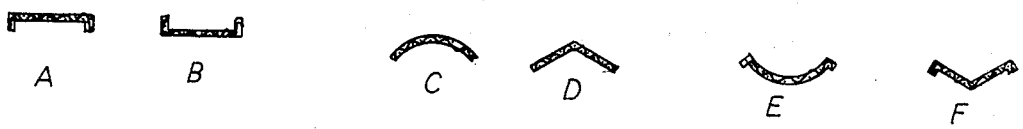

FIGS. 9A to 9F inclusive illustrates belts suitable for use in accordance with the invention having various sculptured shapes, such as the flat belts with vertically up-turned or down-turned flanges at their edges shown in FIGS. 9A and B; the convex curved or V-shaped belts of FIGS. 9C and D, and the concave curved or V-shaped belts with down-turned edge flanges of FIGS. 9E and F — each form being employed with correspondingly shaped supporting pulley surfaces.

The hoppers 16 and 16' have been illustrated as having a liquid-containing sump at their base, to provide a closure to the exterior atmosphere and an outlet for removal of collected particulate material. Other closures can be substituted, as for example, a check valve which can be opened from time to time to permit the collected particles to be ejected.

The de-mister device of this invention has been illustrated as installed on or in a vertical duct in which the gas stream to be decontaminated travels upward. The device can be similarly installed on a duct disposed horizontally or at any angle to the vertical, the only change required in such case being the re-location of the outlet of the hopper or receptacle on each side of the duct, so that the outlet (sump, check valve, or the like) is still at the base of the receptacle, to permit convenient ejection of the collected particles.

Other variations and modifications which will be obvious to those skilled in the art can be made in the de-mister device of this invention without departing from the scope or spirit thereof.

We claim:

1. A de-mister device comprising
   a. a pair of hoppers, supported by a framework, adapted to be fastened to opposite sides of a duct through which particle-laden gases are exhausted,
   b. said hoppers having lateral openings registered with corresponding openings on opposite sides of said duct,
   c. a pair of axially parallel rollers, located in said hoppers, respectively, and journaled therein, parallel to said openings,
   d. a series of belts of foraminous material, resistant to the ambient temperature and corrosive character of said gases and the particles entrained thereby in said duct, said belts being supported by said rollers and extending through said openings across said duct with their surfaces facing the direction of the stream of particle-laden gases traveling through said duct;
   e. means for maintaining mutual spacing of said belts on said rollers along the axes of the latter;
   f. power means driving said rollers to caurse said belts to travel continuously across said duct;
   g. means for directing fluid jets against the surface of said belts within each of said hoppers toward the base of the latter to remove particulate material deposited upon said belts and cause it to fall toward the base of said hoppers, and
   h. means for removing particulate material accumulating within each hopper from the base thereof,
   i. said device further comprising a guide bar parallel to the roller in each of said hoppers, adjacent the lateral opening communicating with said duct, one length of each belt between said rollers being twisted through about 180° between said roller and the adjacent guide bar, the direction of twist at the two ends of said length of belt being opposite, respectively, and the guide bars at opposite ends maintaining each twist through contact with each belt, such that the same surface of each belt length faces the oncoming particle-laden gas stream in said duct.

* * * * *